(12) United States Patent
Pedersen et al.

(10) Patent No.: US 8,974,120 B2
(45) Date of Patent: Mar. 10, 2015

(54) SLIDE BEARING AND METHOD TO PERFORM SERVICE AT THE SLIDING BEARING

(71) Applicants: Bo Pedersen, Lemvig (DK); Kim Thomsen, Ikast (DK)

(72) Inventors: Bo Pedersen, Lemvig (DK); Kim Thomsen, Ikast (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/950,339

(22) Filed: Jul. 25, 2013

(65) Prior Publication Data

US 2014/0086516 A1 Mar. 27, 2014

(30) Foreign Application Priority Data

Sep. 24, 2012 (EP) ..................................... 12185640

(51) Int. Cl.
*F16C 17/00* (2006.01)
*F03D 11/00* (2006.01)
*F16C 17/03* (2006.01)
*F16C 43/02* (2006.01)

(52) U.S. Cl.
CPC ......... *F03D 11/0008* (2013.01); *F16C 2237/00* (2013.01); *F16C 17/03* (2013.01); *F16C 2300/14* (2013.01); *F16C 2360/31* (2013.01); *F16C 43/02* (2013.01); *F05B 2240/50* (2013.01); *Y02E 10/722* (2013.01)

USPC .......................................................... 384/302

(58) Field of Classification Search
CPC ........ F16C 17/02; F16C 17/03; F16C 17/035; F16C 2235/00; F16C 2237/00; F03D 11/0008
USPC ........... 384/95, 117, 282, 302, 303, 304, 309, 384/312, 308; 415/110, 142, 170.1
See application file for complete search history.

(56) References Cited

U.S. PATENT DOCUMENTS

| | | | |
|---|---|---|---|
| 3,975,065 A | 8/1976 | Gravelle | |
| 4,280,267 A | 7/1981 | Christensen | |
| 2010/0177999 A1* | 7/2010 | Waki et al. | 384/312 |
| 2011/0188988 A1* | 8/2011 | Wadehn | 415/1 |
| 2012/0119633 A1 | 5/2012 | Mccarvill | |

FOREIGN PATENT DOCUMENTS

| | | |
|---|---|---|
| EP | 2196668 A2 | 6/2010 |
| EP | 2306008 A2 | 4/2011 |
| WO | WO 2008126362 A1 | 10/2008 |
| WO | WO 2011003482 A2 | 1/2011 |

\* cited by examiner

*Primary Examiner* — Phillip A Johnson

(57) ABSTRACT

A sliding bearing and a service method of performing a service of a sliding bearing are provided. The sliding bearing includes a first bearing shell and a second bearing shell and a plurality of bearing pads arranged between the first bearing shell and the second bearing shell. In addition, the bearing includes an opening in the first bearing shell, wherein the opening is arranged such that the bearing pads are visible through the opening.

17 Claims, 6 Drawing Sheets

SLIDE BEARING AND METHOD TO PERFORM SERVICE AT THE SLIDING BEARING

CROSS REFERENCE TO RELATED APPLICATIONS

The present application claims priority to European Patent Application No. 12185640.5 EP filed Sep. 24, 2012, the entire content of which is hereby incorporated herein by reference.

FIELD OF INVENTION

The invention relates to a sliding bearing and a service method to perform a service at a sliding bearing.

BACKGROUND OF INVENTION

A wind turbine transfers the energy of moving air into electrical energy. The moving air accelerates the rotor of the wind turbine. The rotation of the rotor is transferred to an electrical generator. The electrical generator transforms the rotational energy into electrical energy.

In the last years the concept of a direct driven wind turbine was established. In a direct driven wind turbine the rotational energy of the rotor is transferred to the generator directly without the use of a gearbox.

In a direct driven wind turbine the rotor of the wind turbine is directly connected to the rotor of the electrical generator. The chain of mechanically connected parts leading from the rotor of the wind turbine to the rotor of the generator is called the drive train of the wind turbine.

To allow the rotational movement and to provide the necessary stability of the rotating parts, the drive train is mounted with at least one bearing. This bearing allows the drive train to rotate. At the same time it provides the necessary stability by supporting the radial and axial loads and the bending moments present in the drive train.

WO 2011/003482 A2 describes a wind turbine main bearing realized to bear a shaft of a wind turbine. The bearing comprises a fluid bearing with a plurality of bearing pads.

To perform a service at this bearing and to exchange the bearing pads, the bearing has to be taken apart. The upper part of the outer bearing shell and the side walls of outer bearing shell are removed to gain access to the bearing pads. For the exchange of the bearing pads the shaft of the wind turbine needs to be lifted by help of a lifting arrangement. For this service a lot of space needs to be provided in the nacelle of the wind turbine. In addition the dismantling and assembling of the bearing needs a long time. Thus the service of the main bearing is very expensive and time extensive.

It is also known to dismantle the rotor of the wind turbine by the use of a crane to get access to the main bearing. Then the main bearing is disconnected from the wind turbine and is lowered to the ground to perform the necessary service and exchange the sliding pads. The bearing is then again connected to the wind turbine and the rotor is attached to the main bearing.

It is also known to perform service within the wind turbine. The rotor of the wind turbine is fixed to the nacelle to achieve a load-free bearing. The bearing shells are then separated to gain access to the sliding pads to examine and exchange them. After the service the bearing needs to be assembled again. The bearing shells need to be adjusted. This method also needs a big space within the nacelle or the hub of the wind turbine to handle the shell of the bearing. There is also the problem of dust and foreign particles that can enter the open bearing during the time of service and stay undetected in the bearing when the service is finished and the bearing is closed again.

SUMMARY OF INVENTION

An object is to provide a method to perform service at a sliding bearing that is easier to perform and to describe a bearing specialized for this method of service.

The object is achieved by the features of the independent claims. Preferred embodiments of the invention are described in the dependent claims.

A sliding bearing comprises a first bearing shell and a second bearing shell and a plurality of bearing pads arranged between first and the second bearing shell. In addition the bearing comprises an opening in the first bearing shell, whereby the opening is arranged in a way that the bearing pads are visible through the opening.

A sliding bearing comprises a plurality of bearing pads. The bearing pads are arranged between the first bearing shell and the second bearing shell. The bearing pads are detachably attached to one of the bearing shells and abut on the other bearing shell.

During operation of the bearing, the bearing shells rotate in respect to each other. During operation of the sliding bearing the bearing pads slide along the surface of the other bearing shell.

The bearing pads experience a certain wear due to the operation of the bearing. Thus the bearing pads need to be controlled on a regular basis and need to be exchanged during service of the bearing.

When the bearing pads are worn, the bearing pads are replaced by new bearing pads during the service.

To control or exchange the bearing pads of a sliding bearing, the bearing needs to be opened to gain access to the bearing pads.

The sliding bearing comprises an opening in one of the bearing shells. The opening is positioned in the bearing shell in a way that the bearing pads are visible through the opening. Thus the bearing pads can be controlled through the opening.

Thus the state of the wear of the bearing pads can be controlled. Thus a decision on the exchange of the bearing pads can be achieved.

When the bearing pads are visible through the opening, also the state of the lubrication of the bearing pads is visible. Thus also the state of the lubrication of the bearing can be controlled through the opening.

Thus the service work can be planned in advance. Thus service is more effective. Thus service time is saved. Thus service costs are saved.

The first bearing shell comprises an inner surface that faces the second bearing shell and an outer surface that faces away from the second bearing shell. The opening is a through hole leading from the outer surface to the inner surface of the first bearing shell.

The opening is an opening in the first bearing shell. The opening is a through hole reaching through the first bearing shell. The opening is reaching through the first bearing shell in a way that the bearing pads are visible from outside of the bearing.

Thus the bearing pads are visible trough the opening from outside of the bearing. Thus the bearing does not need to be opened to see and control the bearing pads.

At least one bearing pad is exchangeable and the opening is arranged in a way that the bearing pad is exchangeable through the opening.

Bearing pads in a sliding bearing experience a certain wear during the operation of the bearing. To increase the life-time of the bearing, the bearing pads need to be exchanged. This exchange can be done during a service at the bearing.

A bearing pad is exchangeable through the opening. The bearing pad is exchanged by another bearing pad. Thus the bearing does not need to be opened completely to exchange a bearing pad. Thus the adjustment of the bearing shells is not changed. Thus the danger of foreign particles or dust entering the bearing is minimized. Thus the danger of damage in the bearing due to foreign particles and dust and the danger for an increased wear are minimized.

For the service of larger sliding bearings usually a crane is needed to lift the bearing shells or parts of the bearing shells. When the bearing pads are exchanged through an opening, no bearing shells need to be removed. Thus no crane or heavy machinery is needed for the service of the bearing pads.

The first bearing shell is the stationary part of the bearing.

One of the bearing shells is the rotatable part of the bearing. The other bearing shell is the stationary part of the bearing. During operation the rotatable bearing shell rotates in respect to the stationary bearing shell.

The opening is present in the first bearing shell, which is the stationary bearing shell. Thus the opening is constantly in the same spot. Thus the opening can be planned to be at a place, which shows a good accessibility during service. Thus the opening is easily accessible. Thus service work is performed quicker. Thus service time is saved.

The opening in the first bearing shell is located in an area of the bearing where there is a minimum of load present in the bearing between the first bearing shell and the second bearing shell.

Load is present in the bearing due to the mass attached to the bearing and forces acting at the mass or in the bearing. A bearing shows a certain load pattern, reflecting the distribution of the load in the bearing.

At some places in the bearing, the load can be high or constant. At other places in the bearing the load can be low or variable.

The opening in the first bearing shell is arranged in a place along the bearing with a low load present in the bearing.

Thus fewer loads are present between the bearing pads and the bearing shells at the place of the opening. Thus the exchange of the bearing pads can be performed easier. Thus less service time is used for the exchange of the bearing pads.

Thus less force is necessary for the exchange of the bearing pads. Thus the risk of damages to the bearing pads or the sliding surface of the bearing is minimized.

The second bearing shell is the rotating part of the bearing and the bearing pads are connected to the rotating part of the bearing while a surface of the first bearing shell is used as a sliding surface for the bearing pads.

The second bearing shell is rotatable in respect to the first bearing shell. The bearing pads are detachable attached to the second bearing shell and rotate together with the second bearing shell in respect to the first bearing shell.

Thus the bearing pads can be rotated in respect to the opening in the first bearing shell.

A bearing pad is be controlled or exchanged. The second bearing shell is rotated in respect to the opening until another bearing pad is visible and exchangeable through the opening in the first bearing shell.

Thus a plurality of bearing pads that are arranged along the surface of the second bearing shell is visible and exchangeable through the opening when the bearing is rotatable.

The first bearing shell is the rotating part of the bearing, and the second bearing shell is the stationary part of the bearing. The bearing pads are connected to the stationary part of the bearing, while a surface of the rotatable part of the bearing is used as a sliding surface for the bearing pads.

Thus the bearing pads are stationary together with the stationary part of the bearing. The opening is arranged in the rotatable bearing shell. Thus the rotatable part of the bearing with the opening can be rotated in respect to the bearing pads.

Thus the opening can be rotated to a certain bearing pad that needs to be controlled or exchanged through the opening. Thus a plurality of bearing pads arranged at the stationary part of the bearing is visible and exchangeable through the opening.

A cover plate is provided to close the opening in the first bearing shell. The cover plate comprises a surface that is prepared to be used as a sliding surface and that fills at least a part of the opening in the sliding surface of the first bearing shell. The surface of the cover plate complements to the sliding surface of the bearing shell, when the cover plate is in a closed position.

The opening can be closed by a cover plate. Thus the risk of foreign particles or dust entering the bearing is minimized. Thus the risk of damage in the bearing due to foreign particles or dust is reduced.

The cover plate comprises an inner surface. When the cover plate is arranged in the opening, the inner surface complements the sliding surface of the bearing shell. The cover plate is arranged in a way that the inner surface of the cover plate is at the same level then the sliding surface of the bearing shell. Thus the bearing pads can slide along the sliding surface and the inner surface of the cover plate without experiencing a step. Thus the wear of the bearing pads is reduced. Thus the life-time of the bearing pads is increased.

The cover plate comprises a sealing that is arranged in a way that the sealing is in contact with the cover plate and the first bearing shell when the cover plate is in the closed position. The sealing at least partially seals the gap between the first bearing shell and the cover plate.

Thus the sealing closes the gap between the cover plate and the bearing shell. Thus the entry of particles and dust is avoided or reduced. Also the lubricant present in the bearing is hindered in leaving the bearing. Thus the lubricant stays in the bearing and the lubrication in the bearing is provided.

A bearing pad comprises a carrier body, which is removably connected to a surface, and a liner that is connected to the carrier body and provides a surface capable to move along the sliding surface.

The bearing pad comprises at least a carrier body and a liner. The carrier body is attached, preferably detachably attached to the bearing shell. The liner is detachably attached to the carrier body. The liner is subject to wear.

Thus during service of the bearing only the liner needs to be exchanged. Thus the carrier body stays in the bearing. Thus the amount of material exchanges is reduced. Thus the adjustment of the carrier body is not touched, thus the carrier bode does not need to be adjusted again. Thus service time is saved.

The sliding bearing is a bearing in a wind turbine. The bearing is used as a bearing in a wind turbine. This can be a yaw bearing, a blade pitch bearing or a main bearing of the wind turbine.

Performing service at a bearing of a wind turbine is difficult, because the space in the nacelle or the tower is limited. Thus it is difficult to open the bearing for service work.

The bearing in the wind turbine is a bearing with an opening to control or exchange the bearing pads. Thus the bearing does not have to be opened. Thus the space needed is saved. Only the cover plate needs to be moved from the opening. Thus no heavy machinery or crane is needed for the service of the bearing.

The sliding bearing is the main bearing in a direct driven wind turbine. Especially the main bearing of a wind turbine experiences high loads. Thus the bearing pads need to be controlled and/or exchanged regularly to increase the lifetime of the bearing and the wind turbine.

Through the opening the bearing pads can be controlled and/or exchanged easily. Thus the life-time of the bearing can be increased. Thus the energy production of the wind turbine can be increased. Thus the costs of energy can be lowered. In addition service time is saved.

The condition of a bearing pad is observed through the opening of the first bearing shell when service is performed at the bearing. Through the opening the bearing pads are controlled during service at the bearing.

At least a part of a bearing pad is exchanged through the opening in the first bearing shell. A bearing pad is exchanged during service through the opening in the bearing shell. Thus the bearing can stay mainly closed. Thus the possibility of dust and foreign particles entering the bearing is reduced. Thus no crane or heavy machinery is needed for the service or the exchange of the bearing pads.

A liner of a bearing pad or a carrier body of a bearing pad is exchanged through the opening in the first bearing shell.

The bearing pads comprise a liner and a carrier body. Thus the carrier body stays in the bearing and the liner is exchanged. Thus the material exchanged is limited. Thus the weight of the material exchanged is reduced. Thus the adjustment of the carrier body stays untouched. Thus the carrier body does not need to be adjusted again during service.

The invention is shown in more detail by the help of figures. The figures show a preferred configuration and do not limit the scope of the invention.

DETAILED DESCRIPTION OF INVENTION

Figure 1:
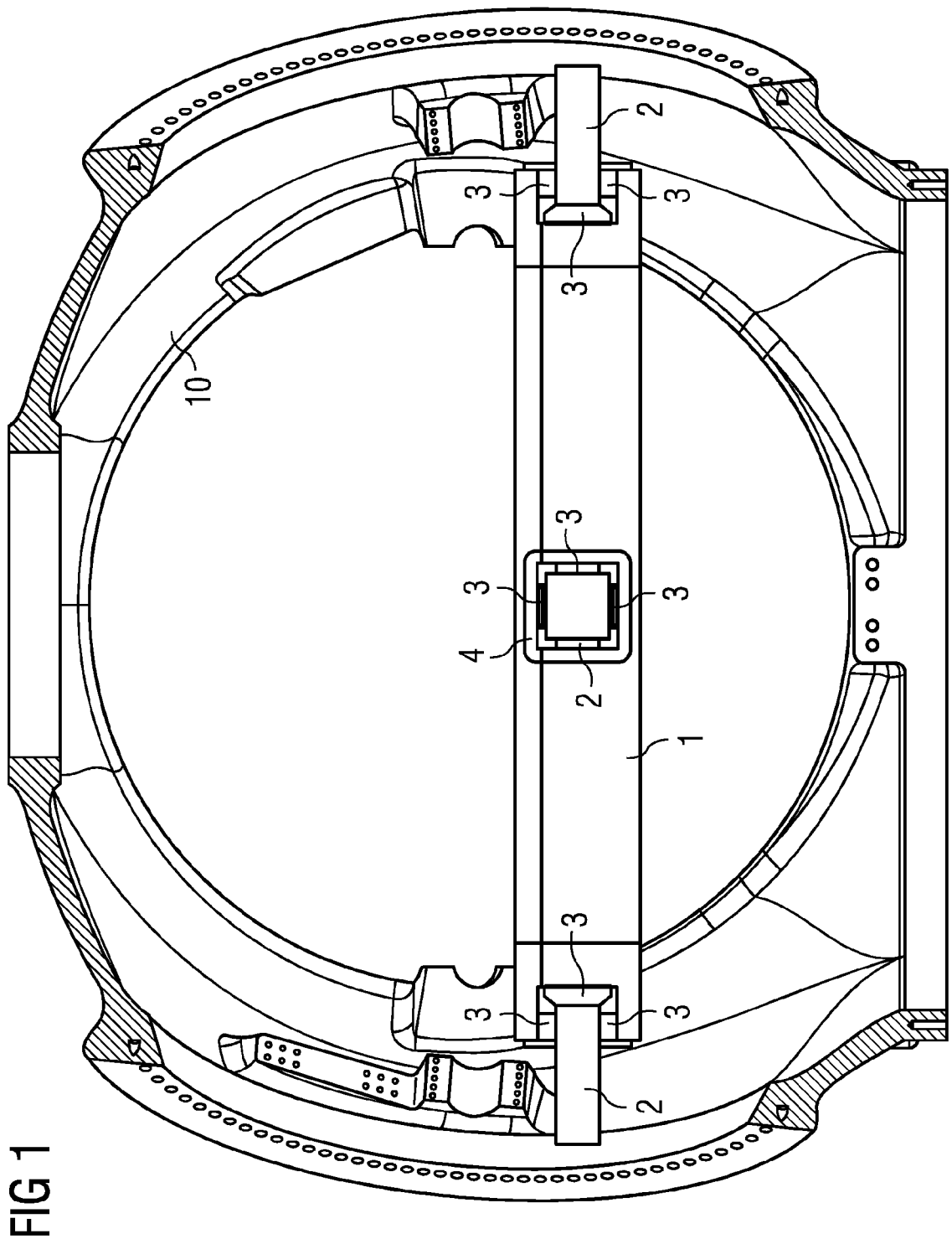
FIG. 1 shows a sliding bearing with an opening.

FIG. 1 shows a sliding bearing with an opening. FIG. 1 shows a cut through a sliding bearing of a hub 10 of a wind turbine. The bearing comprises a first bearing shell 1 and a second bearing shell 2. The second bearing shell 2 is attached to the hub 10 of the wind turbine. The second bearing shell 2 is rotating together with the hub 10 of the wind turbine and is therefore the rotatable part of the bearing.

The first bearing shell 1 is attached to the stationary part of the wind turbine (not shown) and is therefore the stationary part of the bearing.

A number of bearing pads 3 is arranged between the first bearing shell 1 and the second bearing shell 2.

The first bearing shell 1 comprises an opening 4. The bearing pads 3 are visible through the opening 4.

The position of the opening 4 is in a place with a good accessibility during service of the wind turbine for example. The position of the opening 4 can also be chosen to be in an area along the bearing where the loads present in the bearing are low.

The bearing pads 3 are visible through the opening 4 and can also be exchanged through the opening 4. The bearing pads 3 are detachably attached to the second bearing shell 2.

The rotatable part of the bearing, the second bearing shell 2, can be rotated in respect to the first bearing shell 1. Thus all bearing pads 3 present in the bearing can be seen through the opening 4 and can be exchanged.

Figure 2:
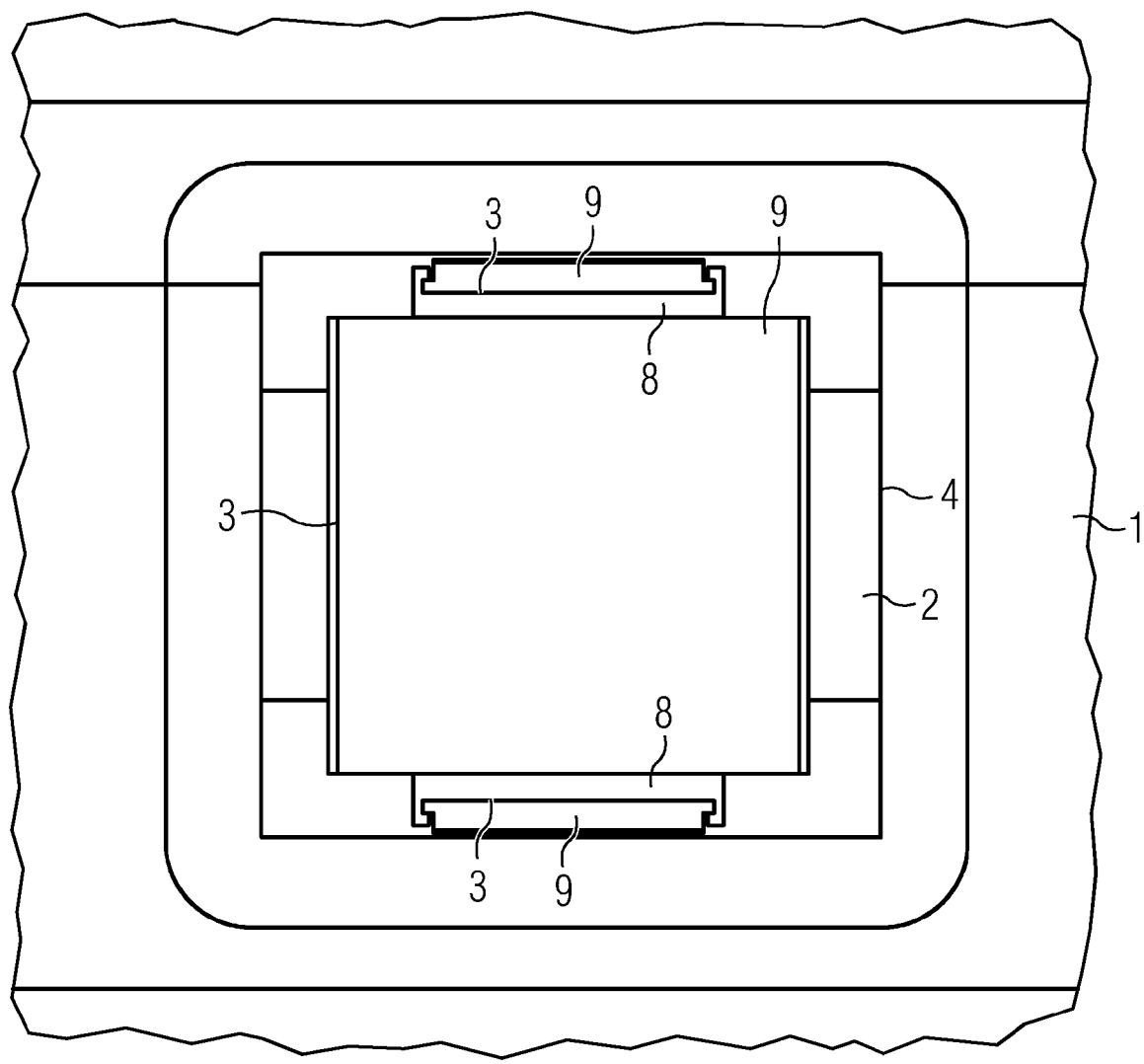
FIG. 2 shows the bearing pads that are visible through the opening.

FIG. 2 shows the bearing pads that are visible through the opening. FIG. 2 shows a detail of the bearing. The opening 4 is visible in the first bearing shell 1. Through the opening 4 the bearing pads 3 are visible. The second bearing shell 2 is also visible between the bearing pads 3.

The bearing pads 3 can be exchanged through the opening 4.

The bearing pads 3 comprise a pad carrier 8 and a liner 9. The liner 9 can easily be exchanged through the opening and replaced by a new liner 9. Also the pad carrier 8 can be exchanged through the opening 4.

Figure 3:
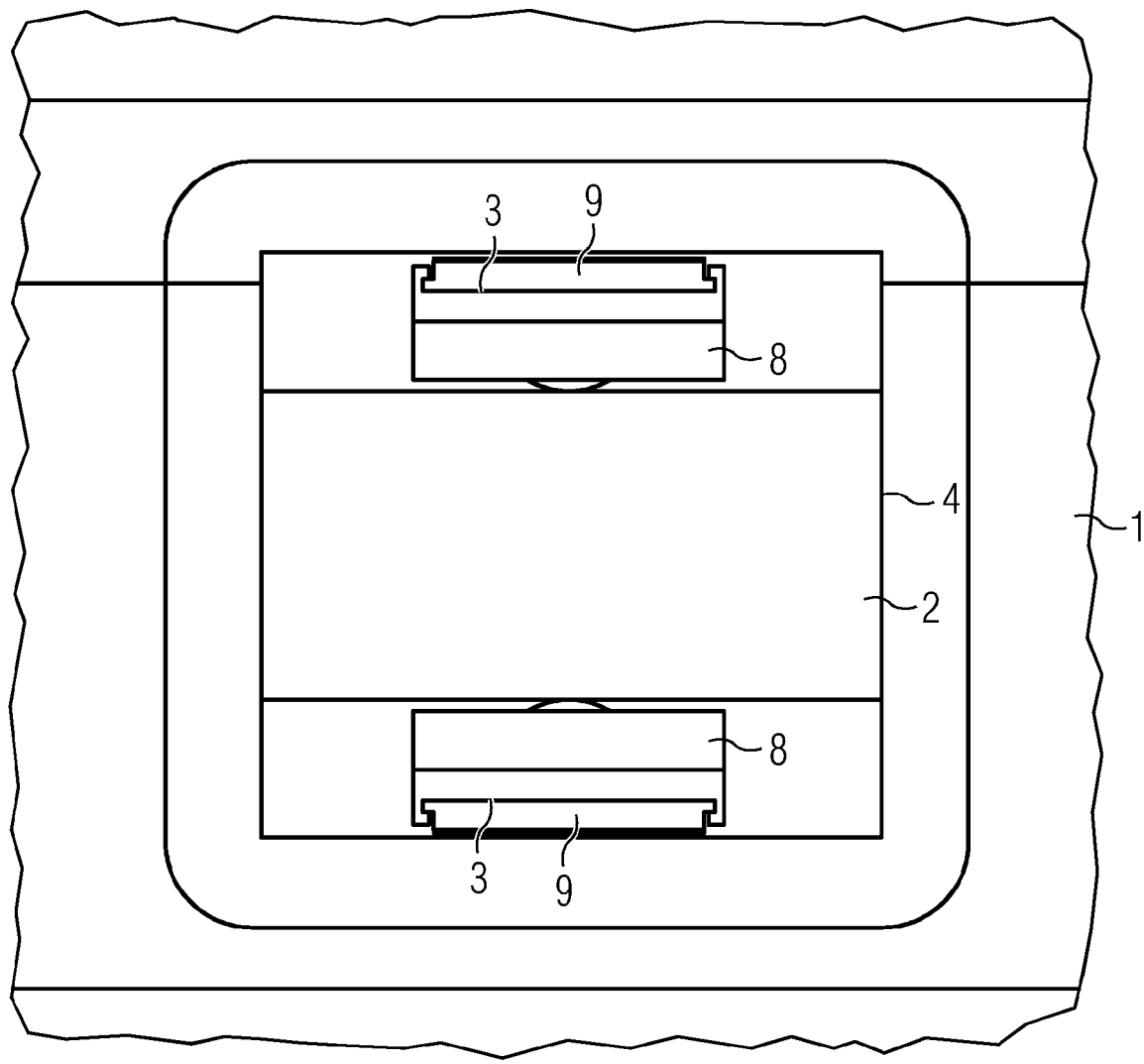
FIG. 3 shows that one bearing pad is removed.

FIG. 3 shows that one bearing pad is removed. FIG. 3 shows the same detail as FIG. 2. In FIG. 3 the upper bearing pad is removed. The second bearing shell 2 is visible through the opening 4. The liners 9 and the pad carriers 8 of the bearing pads 3 are visible.

Figure 4:
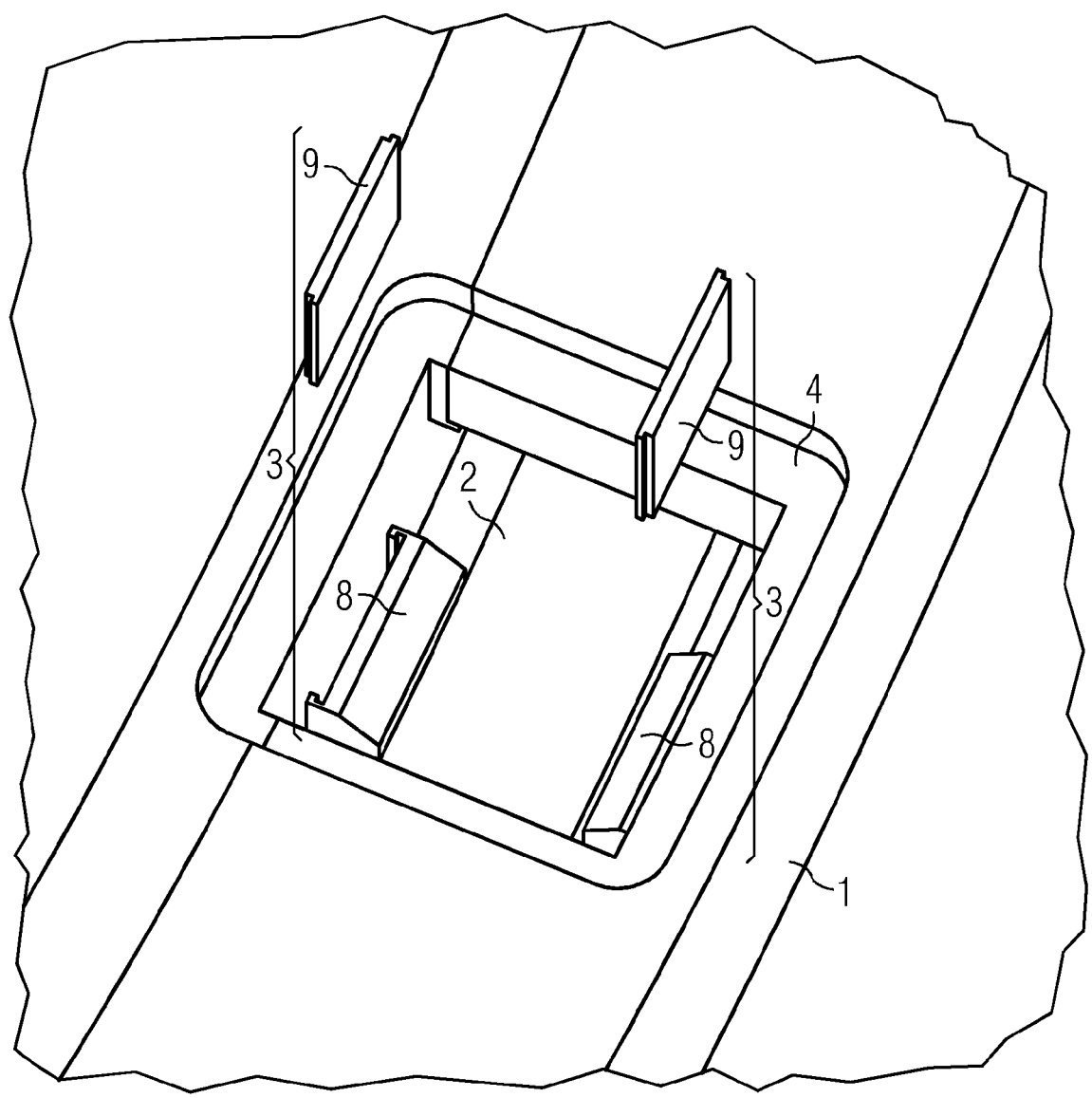
FIG. 4 shows the exchange of liners through the opening.

FIG. 4 shows the exchange of liners through the opening. FIG. 4 shows the opening 4 in the first bearing shell 1. The upper bearing pad is removed. A bearing pad 3 comprises a pad carrier 8 and a liner 9.

The liners 9 are separated from the pad carriers 8 and are pulled out of the bearing through the opening 4. Thus the liners 9 can be replaced during service.

After a liner 9 of a bearing pad 3 is replaced, the rotatable part of the bearing, the second bearing shell 2, is rotated. The second bearing shell 2 is rotated as far, that the next bearing pad 3 is visible through the opening 4. The next bearing pad 3 can then be exchanged.

Figure 5:
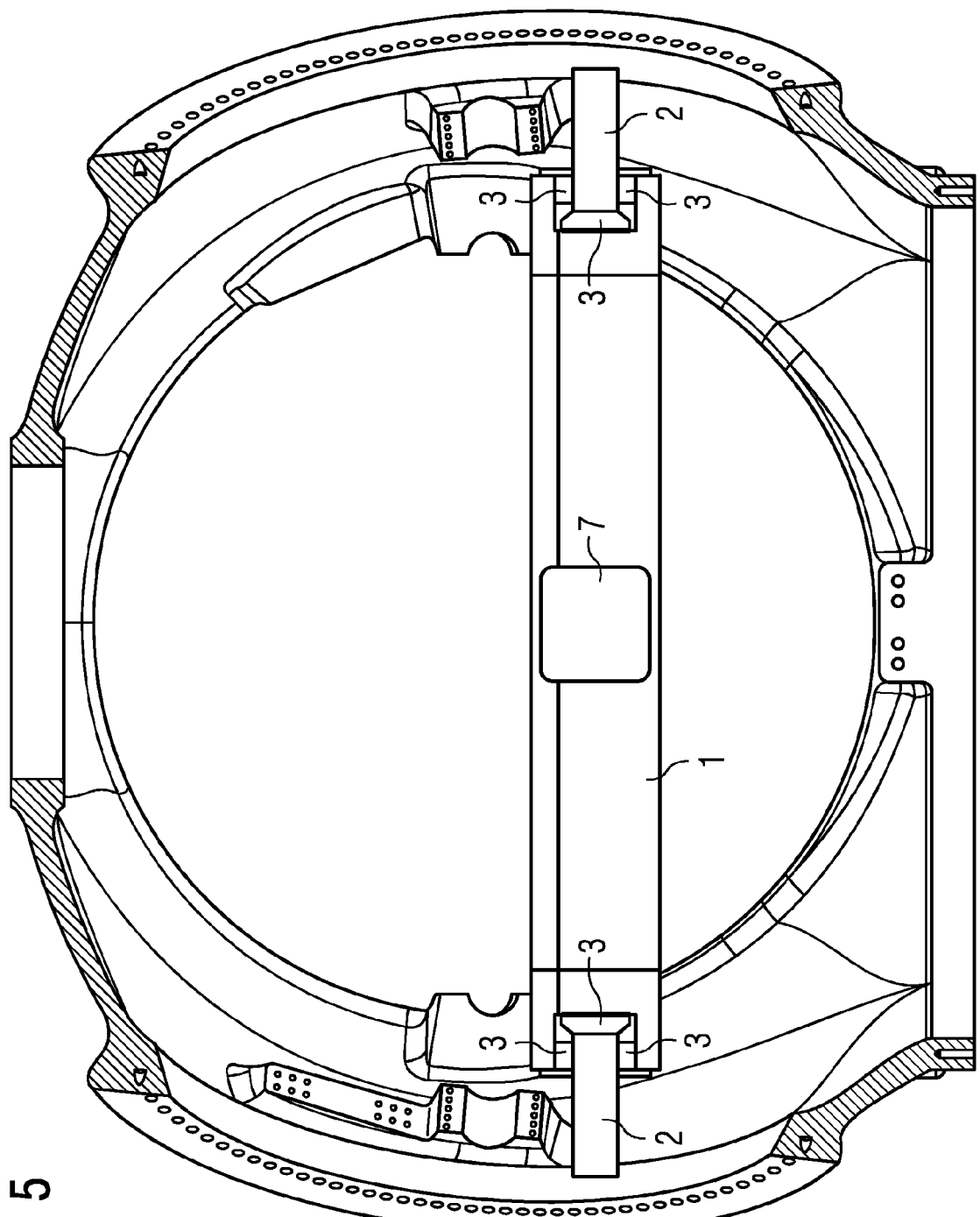
FIG. 5 shows an opening with a cover plate.

FIG. 5 shows an opening with a cover plate. FIG. 5 shows the first bearing shell 1 of the bearing. The opening is covered by a cover plate 7.

Figure 6:
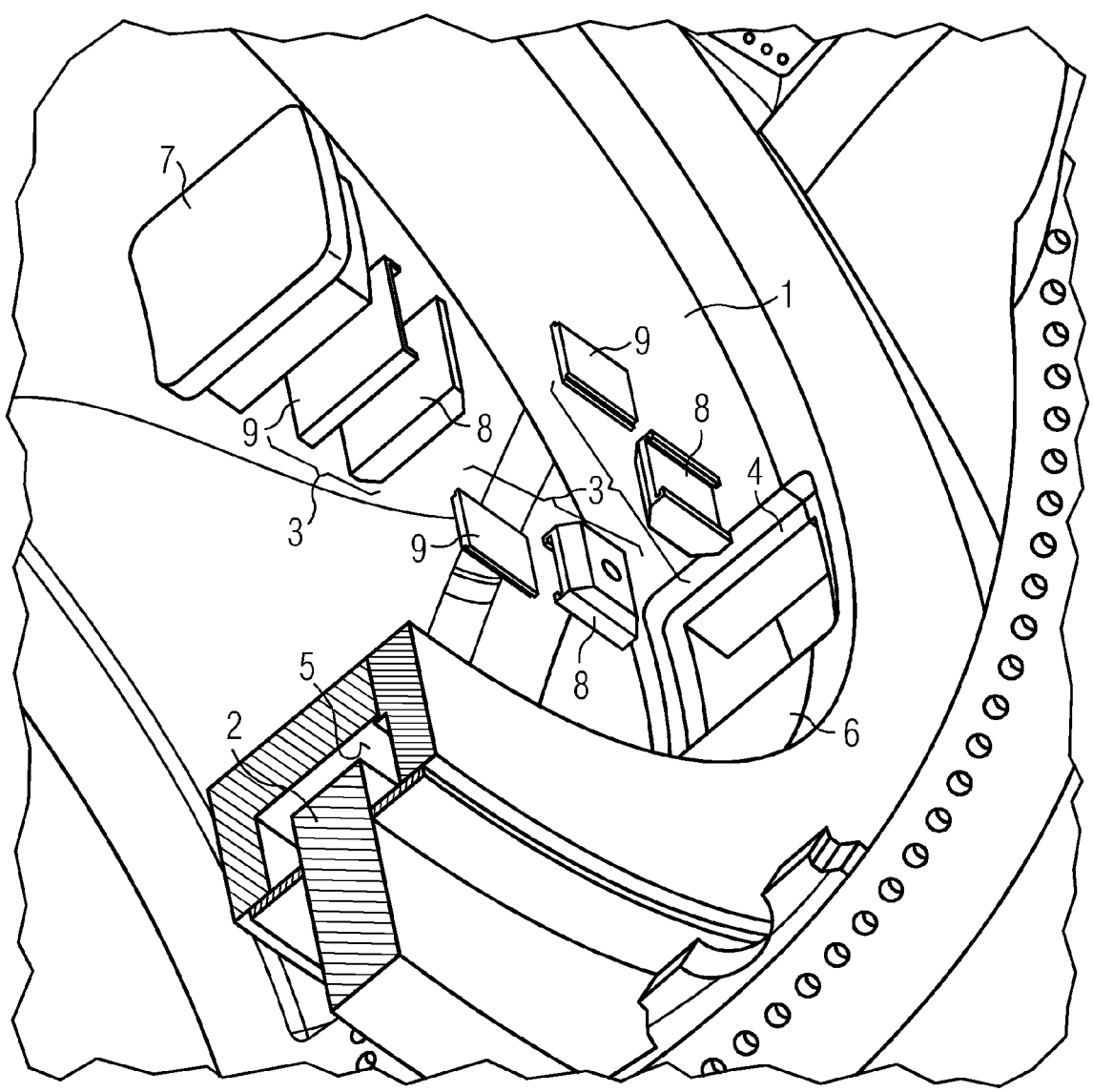
FIG. 6 shows the exchange of the bearing pads.

FIG. 6 shows the exchange of the bearing pads. FIG. 6 shows a perspective view of the bearing. The first bearing shell 1 is the stationary part of the bearing. The second bearing shell 2 is the rotatable part of the bearing.

The cover plate 7 is removed from the first bearing shell 1, so that the opening 4 is free and the bearing pads 3 can be seen and exchanged through the opening 4. The opening 4 is a through hole that reaches from the inner surface 5 of the first bearing shell 1 to the outer surface 6.

Three bearing pads 3 are visible. The bearing pads 3 comprise a liner 9 and a pad carrier 8. The liners 9 can be separated from the pad carriers 8 and can thus be exchanged separately.

Also the pad carriers 8 can be exchanged through the opening 4. The pad carriers 8 are detachably attached to the second bearing shell 2. The second bearing shell 2 can be rotated in respect to the first bearing shell 1. So all bearing pads 3 present between the first bearing shell 1 and the second bearing shell 2 can be seen and exchanged through the opening 4.

The opening 4 is closed by the cover plate 7 during the normal operation of the bearing. Thus the bearing is tight in relation to dust and lubrication. The cover plate 7 has a sealing that is present between the cover plate 7 and the rim of the opening 4.

When the cover plate 7 is placed to close the opening 4, a part of the surface of the cover plate 7 is used as a sliding surface for the bearing pads 3. The surface of the cover plate 7 complements the sliding surface of the first bearing shell 1.

The invention claimed is:
1. A sliding bearing, comprising:
 a first bearing shell,
 a second bearing shell, a plurality of bearing pads arranged between the first bearing shell and the second bearing shell,
an opening in the first bearing shell,
wherein the opening is arranged such that the bearing pads are visible through the opening
wherein a cover plate is provided to close the opening in the first bearing shell,
wherein the cover plate comprises a surface that is prepared to be used as a sliding surface and that fills at least a part of the opening in the sliding surface of the first bearing shell and complements to the sliding surface of the bearing shell when the cover plate is in a closed position.

2. The sliding bearing according to claim 1,
wherein the first bearing shell comprises an inner surface that faces the second bearing shell and an outer surface that faces away from the second bearing shell,
wherein the opening is a through hole leading from the outer surface to the inner surface of the first bearing shell.

3. The sliding bearing according to claim 1, wherein the first bearing shell is a stationary part of the sliding bearing.

4. The sliding bearing according to claim 3, wherein the opening in the first bearing shell is located in an area of the bearing where there is a minimum of load present in the bearing between the first bearing shell and the second bearing shell.

5. The sliding bearing according to claim 3, wherein the second bearing shell is a rotating part of the sliding bearing and wherein the bearing pads are connected to the rotating part while a surface of the first bearing shell is used as a sliding surface for the bearing pads.

6. The sliding bearing according to claim 1,
wherein the first bearing shell is a rotating part of the bearing, and the second bearing shell is a stationary part of the bearing and
wherein the bearing pads are connected to the stationary part of the bearing, while a surface of the rotatable part of the bearing is used as a sliding surface for the bearing pads.

7. The sliding bearing according to claim 1, wherein the cover plate comprises a sealing that is arranged such that the sealing is in contact with the cover plate and the first bearing shell when the cover plate is in the closed position, so that the sealing at least partially seals the gap between the first bearing shell and the cover plate.

8. A wind turbine comprising:
a hub; and
a sliding bearing according to claim 1 connected to the hub.

9. A sliding bearing, comprising:
a first bearing shell,
a second bearing shell,
a plurality of bearing pads arranged between the first bearing shell and the second bearing shell,
an opening in the first bearing shell,
wherein the opening is arranged such that the bearing pads are visible through the opening,
wherein a bearing pad comprises a carrier body, which is removably connected to a surface, and a liner that is connected to the carrier body and provides a surface capable to move along the sliding surface.

10. A wind turbine comprising:
a hub; and
a sliding bearing according to claim 9 connected to the hub.

11. The sliding bearing according to claim 9,
wherein the first bearing shell comprises an inner surface that faces the second bearing shell and an outer surface that faces away from the second bearing shell,
wherein the opening is a through hole leading from the outer surface to the inner surface of the first bearing shell.

12. The sliding bearing according to claim 9, wherein the first bearing shell is a stationary part of the sliding bearing.

13. The sliding bearing according to claim 12, wherein the opening in the first bearing shell is located in an area of the bearing where there is a minimum of load present in the bearing between the first bearing shell and the second bearing shell.

14. The sliding bearing according to claim 12, wherein the second bearing shell is a rotating part of the sliding bearing and wherein the bearing pads are connected to the rotating part while a surface of the first bearing shell is used as a sliding surface for the bearing pads.

15. The sliding bearing according to claim 9,
wherein the first bearing shell is a rotating part of the bearing, and the second bearing shell is a stationary part of the bearing and
wherein the bearing pads are connected to the stationary part of the bearing, while a surface of the rotatable part of the bearing is used as a sliding surface for the bearing pads.

16. The sliding bearing according to claim 9,
wherein a cover plate is provided to close the opening in the first bearing shell,
wherein the cover plate comprises a surface that is prepared to be used as a sliding surface and that fills at least a part of the opening in the sliding surface of the first bearing shell and complements to the sliding surface of the bearing shell when the cover plate is in a closed position.

17. The sliding bearing according to claim 16,
wherein the cover plate comprises a sealing that is arranged such that the sealing is in contact with the cover plate and the first bearing shell when the cover plate is in the closed position, so that the sealing at least partially seals the gap between the first bearing shell and the cover plate.

* * * * *